United States Patent
Takeuchi et al.

(10) Patent No.: US 11,585,392 B2
(45) Date of Patent: Feb. 21, 2023

(54) WET FRICTION DISC AND FRICTION ENGAGING DEVICE

(71) Applicants: JTEKT CORPORATION, Kariya (JP); TOYOTA JIDOSHA KABUSHIKI KAISHA, Toyota (JP)

(72) Inventors: Yoshiki Takeuchi, Kariya (JP); Hiroshi Takuno, Nukata-gun (JP); Kazuaki Kamimura, Takahama (JP); Takeshi Nakamura, Kashiwara (JP); Takahiro Yoshimura, Toyota (JP); Masaya Michishita, Okazaki (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/481,814

(22) Filed: Sep. 22, 2021

(65) Prior Publication Data
US 2022/0090638 A1 Mar. 24, 2022

(30) Foreign Application Priority Data
Sep. 23, 2020 (JP) .............................. JP2020-158689

(51) Int. Cl.
*F16D 13/74* (2006.01)
*F16D 27/04* (2006.01)
*F16D 13/64* (2006.01)

(52) U.S. Cl.
CPC .............. *F16D 13/74* (2013.01); *F16D 13/64* (2013.01); *F16D 27/04* (2013.01)

(58) Field of Classification Search
CPC ........ F16D 13/64; F16D 13/648; F16D 13/72; F16D 13/74; F16D 2069/004; F16D 27/112–115
See application file for complete search history.

(56) References Cited

U.S. PATENT DOCUMENTS

| 3,184,023 A | 5/1965 | Hovde |
| 4,022,298 A * | 5/1977 | Malinowski ............ B60T 1/065 188/71.6 |

(Continued)

FOREIGN PATENT DOCUMENTS

| DE | 19734840 A1 * | 2/1999 | ............. F16D 13/52 |
| DE | 10 2017 128 403 A1 | 6/2019 | |
| JP | 2016-211713 A | 12/2016 | |

OTHER PUBLICATIONS

Office Action dated Apr. 29, 2022 in co-pending U.S. Appl. No. 17/481,853, citing documents AA through AC and AO therein, 11 pages.

(Continued)

*Primary Examiner* — David R Morris
(74) *Attorney, Agent, or Firm* — Oblon, McClelland, Maier & Neustadt, L.L.P.

(57) ABSTRACT

A wet friction disc includes a friction surface and a lubrication groove through which a lubricant supplied to the friction surface flows. The lubrication groove has a plurality of circumferential groove portions that extends in a circumferential direction and a plurality of intersecting groove portions that extends in directions intersecting the circumferential direction. At least one of the circumferential groove portions has a through-hole that extends through the wet friction disc between an opposite surface facing s mating member and a surface on the opposite side in an axial direction.

4 Claims, 10 Drawing Sheets

(56) References Cited

U.S. PATENT DOCUMENTS

| | | | |
|---|---|---|---|
| 4,995,500 A * | 2/1991 | Payvar | F16D 13/72 |
| | | | 188/218 XL |
| 5,671,835 A | 9/1997 | Tanaka et al. | |
| 5,682,971 A | 11/1997 | Takakura et al. | |
| 2002/0153213 A1 * | 10/2002 | Gruber | C04B 35/83 |
| | | | 188/218 XL |
| 2015/0337908 A1 * | 11/2015 | Wang | B21D 53/26 |
| | | | 72/82 |
| 2016/0333946 A1 | 11/2016 | Takeuchi et al. | |
| 2020/0408263 A1 | 12/2020 | Adrian et al. | |
| 2022/0090638 A1 | 3/2022 | Takeuchi et al. | |
| 2022/0090639 A1 | 3/2022 | Takeuchi et al. | |

OTHER PUBLICATIONS

Notice of Allowance dated Oct. 4, 2022 in co-pending U.S. Appl. No. 17/481,853, citing document 1 therein, 11 pages.

* cited by examiner

WET FRICTION DISC AND FRICTION ENGAGING DEVICE

CROSS-REFERENCE TO RELATED APPLICATION

This application claims priority to Japanese Patent Application No. 2020-158689 filed on Sep. 23, 2020, incorporated herein by reference in its entirety.

BACKGROUND

1. Technical Field

The present disclosure relates to a wet friction disc and a friction engaging device.

2. Description of Related Art

Wet friction discs that slide on a mating member in an environment where a lubricant is present are used for vehicles, for example, in a clutch device that transmits torque between rotating members of a driving system and in a braking device that brakes the rotation of rotating members. For example, Japanese Unexamined Patent Application Publication No. 2016-211713 (JP 2016-211713 A) discloses a device that includes an inner plate and an outer plate as wet friction discs capable of switching between a state of being frictionally engaged with each other and a state of not being frictionally engaged with each other in an environment where a lubricant is present, and that brakes the rotation of a shaft relative to a housing member. Lubricating oil serves to reduce frictional heat generated between the inner plate and the outer plate that frictionally slide on each other, wear of these plates, etc.

From the viewpoint of enhancing the responsiveness, clutch devices and braking devices in which the inner plate and the outer plate are lubricated as described above are required to quickly discharge the lubricating oil from between the inner plate and the outer plate at the time of switching between the non-frictionally-engaged state and the frictionally-engaged state. Specifically, when the inner plate and the outer plate switch from the non-frictionally-engaged state to the frictionally-engaged state, the lubricating oil needs to be quickly discharged from between the inner plate and the outer plate to promptly establish frictional engagement between these plates. When the inner plate and the outer plate switch from the frictionally-engaged state to the non-frictionally-engaged state, the lubricating oil needs to be quickly discharged from between the inner plate and the outer plate to mitigate a decrease in responsiveness caused by drag torque due to the viscosity of the lubricating oil present between these plates.

To meet this requirement, the device described in JP 2016-211713 A has a lubrication groove provided in a surface, facing the outer plate, of the inner plate that rotates integrally with the shaft into which rotation is input. The lubrication groove serves to let the lubricating oil out from between the inner plate and the outer plate toward an outer circumferential side by a centrifugal force exerted by the inner plate as it rotates. Here, the lubrication groove described in JP 2016-211713 A is provided in a lattice pattern at an angle to both the radial direction and the circumferential direction of the inner plate.

SUMMARY

FIG. 12 is a schematic view with the arrows indicating the flow of lubricating oil when a lubrication groove is provided in an inner plate in a lattice pattern like the one described in JP 2016-211713 A. In FIG. 12, a region where the lubricating oil flows in a higher volume is represented by a larger arrow. As shown in FIG. 12, in an inner plate 9, most of the lubricating oil flowing through a lubrication groove 91 as the inner plate 9 rotates flows in an oblique direction that is oriented toward the outer circumferential side (i.e., the upper side of the drawing) as well as proportionately toward the opposite side from a rotation direction R of the inner plate 9. This is because a force combining the inertial force of the lubricating oil trying to stand still against the rotation of the inner plate 9 and the centrifugal force exerted by the inner plate 9 as it rotates acts in a direction along the oblique direction and the lubricating oil is subjected to this force acting in the oblique direction. However, the lubricating oil having flowed to a point of intersection in the lattice-patterned lubrication groove 91 hits a corner 921 of a land 92 of the inner plate 9 defined by the lubrication groove 91, and part of the lubricating oil branches off toward an inner circumferential side in the radial direction. Thus, the lubricating oil present between the inner plate 9 and the outer plate may be hindered from being efficiently discharged toward the outer circumferential side.

Here, it is also possible to configure the lubrication groove in a lattice pattern simply with annular circumferential groove portions that extend in the circumferential direction and intersecting groove portions that intersect these circumferential groove portions. This configuration can reduce the likelihood that when the inner plate rotates, the lubricating oil may flow toward the inner circumferential side by hitting the corner of a land.

However, when the circumferential groove portions are provided along the entire circumference, unless special means is employed, the lubricating oil flowing through the circumferential groove portions along the circumferential direction is not smoothly discharged toward the outer circumferential side. Thus, there is room for improvement from the viewpoint of more efficiently discharging the lubricating oil present between the inner plate and the outer plate toward the outer circumferential side.

The present disclosure provides a wet friction disc and a friction engaging device that can discharge the lubricant more efficiently.

A wet friction disc according to a first aspect of the present disclosure includes: a friction surface that frictionally slides on a mating member disposed so as to face the wet friction disc in an axial direction, and a lubrication groove which is provided in an opposite surface that faces the mating member and through which a lubricant supplied to the friction surface flows. The lubrication groove has a plurality of circumferential groove portions that extends in a circumferential direction and a plurality of intersecting groove portions that extends in directions intersecting the circumferential direction. At least one of the circumferential groove portions has a through-hole that extends through the wet friction disc between the opposite surface and a surface on the opposite side in the axial direction.

A friction engaging device according to a second aspect of the present disclosure includes: the wet friction disc according to claim 1; a mating member disposed so as to face the wet friction disc in an axial direction; and a magnetic coil disposed next to the wet friction disc and the mating member in the axial direction. The wet friction disc and the mating member are each made of a soft magnetic material and constitute a magnetic path of magnetic flux that is generated as a current is applied to the magnetic coil. The magnetic path is configured to have a pair of first magnetic path portions that passes through the wet friction disc and the mating member in the axial direction and is disposed at positions spaced from each other in a radial direction, and a pair of second magnetic path portions that connects the pair of first magnetic path portions to each other at both ends. The through-hole is disposed in an area between the pair of first magnetic path portions in the radial direction.

The present disclosure having these aspects can provide a wet friction disc and a friction engaging device that can discharge the lubricant more efficiently.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

An embodiment of the present disclosure will be described with reference to FIG. 1 to FIG. 8. The embodiment to be described below will be shown as a specific example suitable for implementing the present disclosure. While some part of the embodiment specifically illustrates various technical items that are technically preferred, the technical scope of the present disclosure is not limited to such specific aspects.

Braking Device 10

A braking device 10 as a friction engaging device including a wet friction disc 1 of the embodiment will be described. Hereinafter, a direction in which a central axis of the wet friction disc 1, i.e., an armature 5, to be described later, extends will be referred to as an axial direction. A radial direction of the wet friction disc 1 will be referred to simply as a radial direction and a circumferential direction of the wet friction disc 1 will be referred to simply as a circumferential direction.

Figure 1:
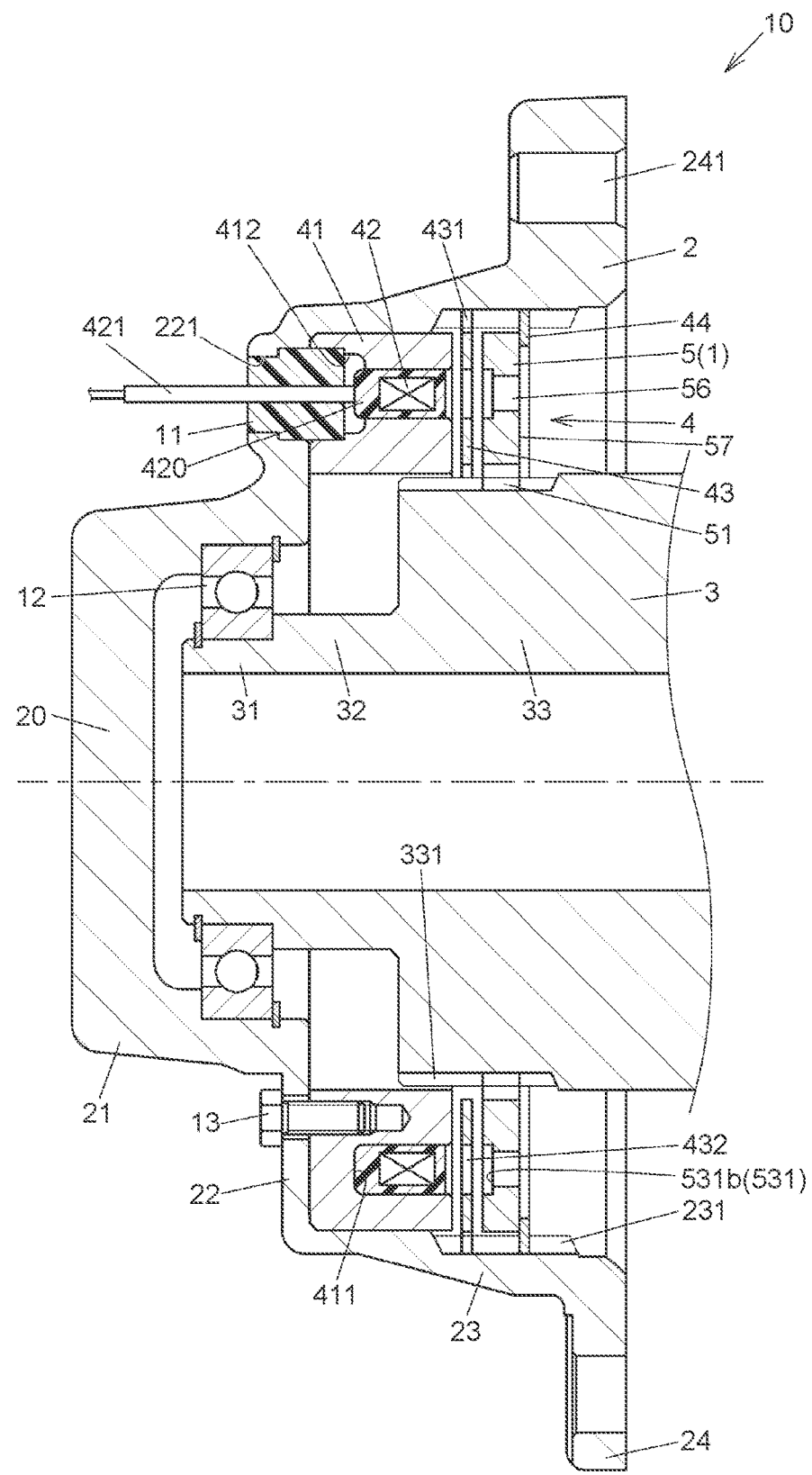
FIG. 1 is a sectional view of a braking device in a first embodiment.
Figure 2:
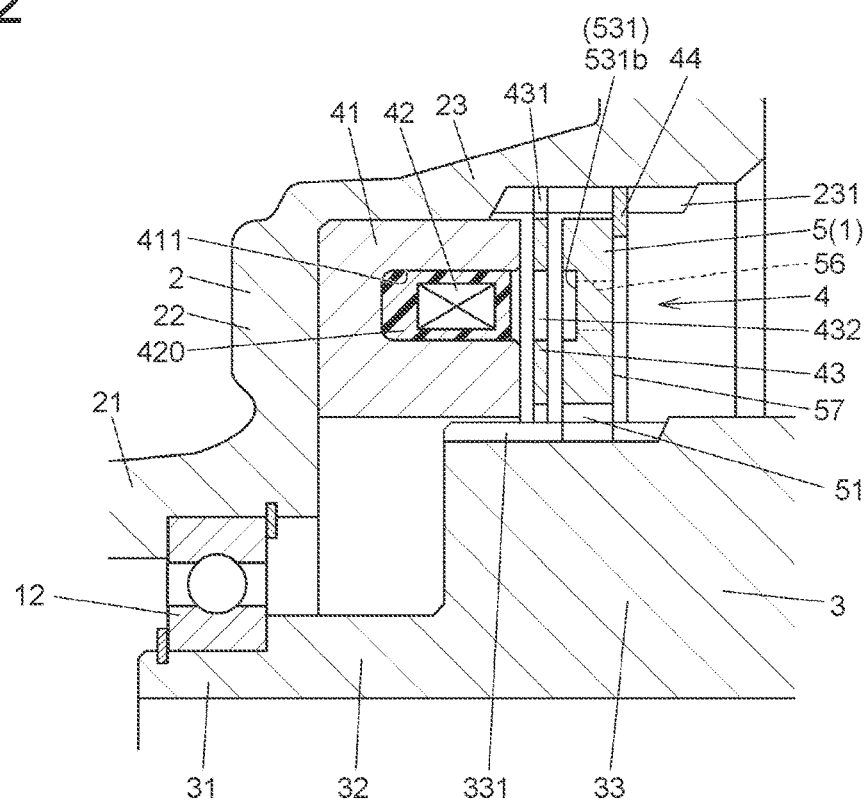
FIG. 2 is an enlarged sectional view around a braking mechanism of the braking device in the first embodiment.
Figure 3:
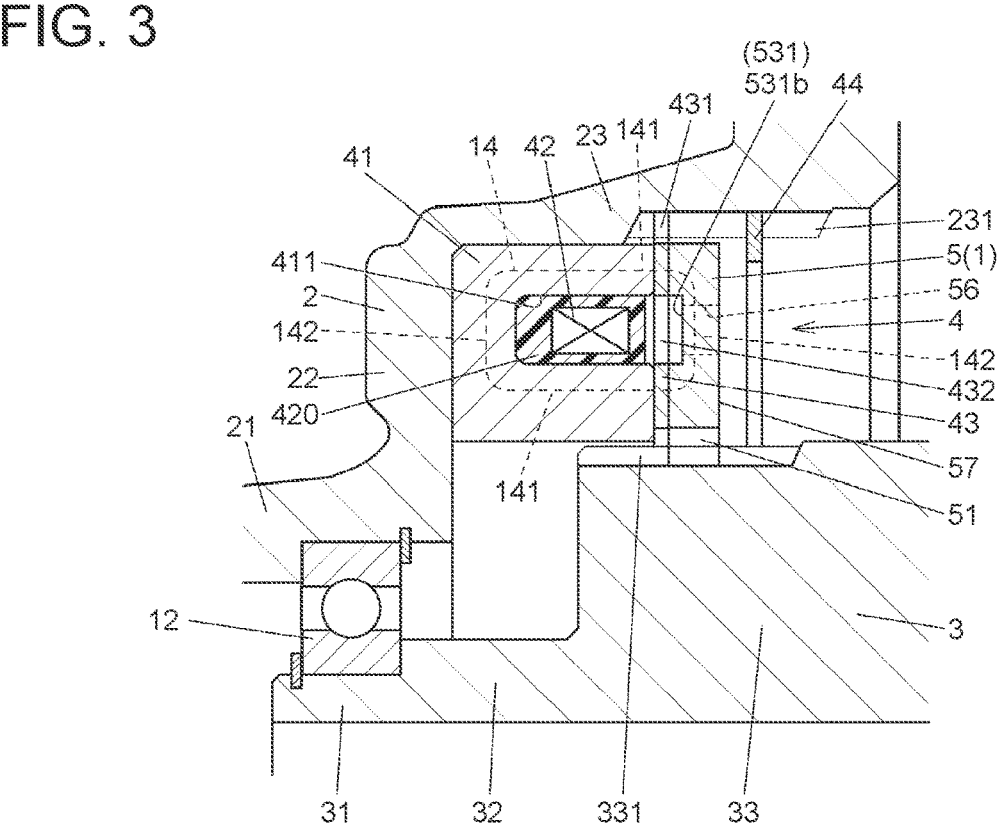
FIG. 3 is an enlarged sectional view around the braking mechanism of the braking device when a magnetic coil is carrying a current in the first embodiment.

FIG. 1 is a sectional view of the braking device 10 in this embodiment. FIG. 2 is an enlarged sectional view around a braking mechanism 4, to be described later, of the braking device 10. FIG. 3 is an enlarged sectional view around the braking mechanism 4 of the braking device 10 when a magnetic coil 42 is carrying a current.

The braking device 10 is configured to brake the rotation of a shaft 3 when the braking mechanism 4 is activated. The braking device 10 includes a housing member 2, the shaft 3, and the braking mechanism 4.

The housing member 2 is made of a non-magnetic material and fixed on a vehicle body so as not to rotate relatively to the vehicle body. The housing member 2 includes a bottom wall 20, a small-diameter tubular part 21, an annular wall 22, a large-diameter tubular part 23, and a flange 24. The bottom wall 20 has a planar shape spreading in directions orthogonal to the axial direction and closes one end of the small-diameter tubular part 21 in the axial direction. The small-diameter tubular part 21 has a tubular shape extending in the axial direction. The annular wall 22 has an annular shape so as to spread toward an outer circumferential side from an end of the small-diameter tubular part 21 on the opposite side from a side where the bottom wall 20 is located.

The large-diameter tubular part 23 extends from an outer circumferential edge of the annular wall 22 toward the opposite side in the axial direction from the side where the small-diameter tubular part 21 is located, and has a tubular shape with the inside diameter and the outside diameter larger than those of the small-diameter tubular part 21. An opening is formed on the side of the large-diameter tubular part 23 opposite from the side where the annular wall 22 is located. An inner circumferential surface of the large-diameter tubular part 23 has internal spline teeth 231 that are formed at a plurality of locations in the circumferential direction and extend along the axial direction. The internal spline teeth 231 are spline-engaged with an outer plate 43 to be described later.

The flange 24 is formed so as to spread toward the outer circumferential side from the end of the large-diameter tubular part 23 on the opening side. The flange 24 has a bolt insertion hole 241 for fastening the flange 24 with a bolt to a fixed cover (not shown) fixed on the vehicle body. The fixed cover is, for example, a transmission case. The shaft 3 is rotatably supported on an inner circumference of the small-diameter tubular part 21 through a bearing 12.

The shaft 3 includes a small-diameter shaft part 31, a medium-diameter shaft part 32, and a large-diameter shaft part 33 in this order from an end in the axial direction. The bearing 12 is fitted on an outer circumferential surface of the small-diameter shaft part 31. The medium-diameter shaft part 32 has a larger diameter than the small-diameter shaft part 31. The medium-diameter shaft part 32 faces the bearing 12 in the axial direction and serves to position the bearing 12 in the axial direction.

The large-diameter shaft part 33 has a larger diameter than the medium-diameter shaft part 32. On an outer circumference of the large-diameter shaft part 33 at an end on the side of the medium-diameter shaft part 32, external spline teeth 331 extending along the axial direction are formed at a plurality of locations in the circumferential direction. The armature 5 is spline-engaged with the external spline teeth 331. The external spline teeth 331 are formed at positions facing the internal spline teeth 231 of the housing member 2 in the radial direction.

The braking mechanism 4 is disposed in housing space inside the housing member 2, on the outer circumferential side of the shaft 3. The braking mechanism 4 includes a yoke 41, the magnetic coil 42, the outer plate 43, the armature 5, and a snap ring 44.

The yoke 41 is formed by an annular soft magnetic body. The yoke 41 is fitted inside the large-diameter tubular part 23 of the housing member 2 and fastened with a bolt 13 to the annular wall 22 of the housing member 2. The yoke 41 has an annular mounting recess 411 that opens in a surface of the yoke 41 on a side opposite from the annular wall 22 and is depressed from the surface in the axial direction. The magnetic coil 42 is disposed inside the mounting recess 411. Part of the mounting recess 411 in the circumferential direction communicates with a yoke hole 412 which is bored on the side of the annular wall 22 in the axial direction and through which a wire of the magnetic coil 42 is led out.

The magnetic coil 42 is formed by, for example, an enamel wire that is a conductive wire coated with enamel and wound into an annular shape. The magnetic coil 42 is sealed by a seal resin 420 inside the mounting recess 411. The magnetic coil 42 is electrically connected to the lead wire 421 led out from the seal resin 420, and is supplied with an excitation current through the lead wire 421.

The lead wire 421 is led to an outside of the housing member 2 by passing through a rubber cap 11 that is fitted in an annular wall hole 221 formed in the annular wall 22 of the housing member 2. The cap 11 hermetically closes the gap between the lead wire 421 and the annular wall hole 221. On the side of the yoke 41 and the magnetic coil 42 opposite from the annular wall 22 in the axial direction, the outer plate 43, the armature 5, and the snap ring 44 are disposed in this order from the side closer to the yoke 41.

Figure 8:
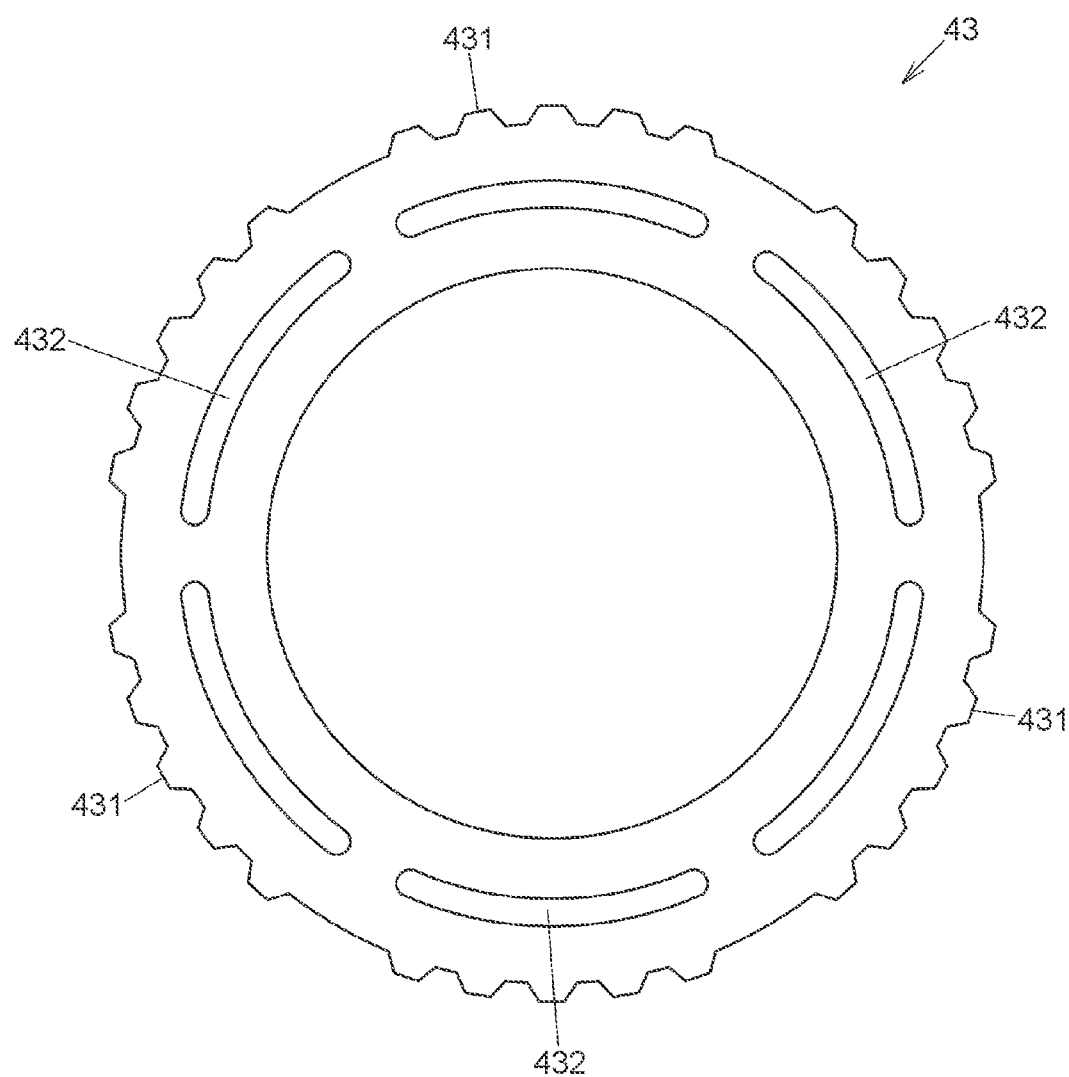
FIG. 8 is a front view of an outer plate in the first embodiment.

FIG. 8 is a front view of the outer plate 43. The outer plate 43 is formed by a soft magnetic body in an annular shape and has external teeth 431 on an outer circumference. The external teeth 431 are spline-engaged with the internal spline teeth 231 of the housing member 2. Thus, the outer plate 43 is unable to rotate, but movable in the axial direction, relatively to the housing member 2.

The outer plate 43 has a plurality of slits 432 that is formed at positions facing the mounting recess 411 of the yoke 41 in the axial direction and extends in the circumferential direction. The slits 432 serve to prevent magnetic flux generated as a current is applied to the magnetic coil 42 from short-circuiting without passing through the armature 5. In this embodiment, six slits 432 elongated in the circumferential direction are formed at regular intervals in the circumferential direction.

While this is not shown, microgrooves extending in the circumferential direction are formed in a surface of the outer plate 43 that faces the armature 5. The outer plate 43 including these microgrooves is formed by pressing, and the surface of the outer plate 43 is subjected to nitriding treatment to secure hardness. The outer plate 43 is disposed so as to face the armature 5 in the axial direction.

Figure 4:
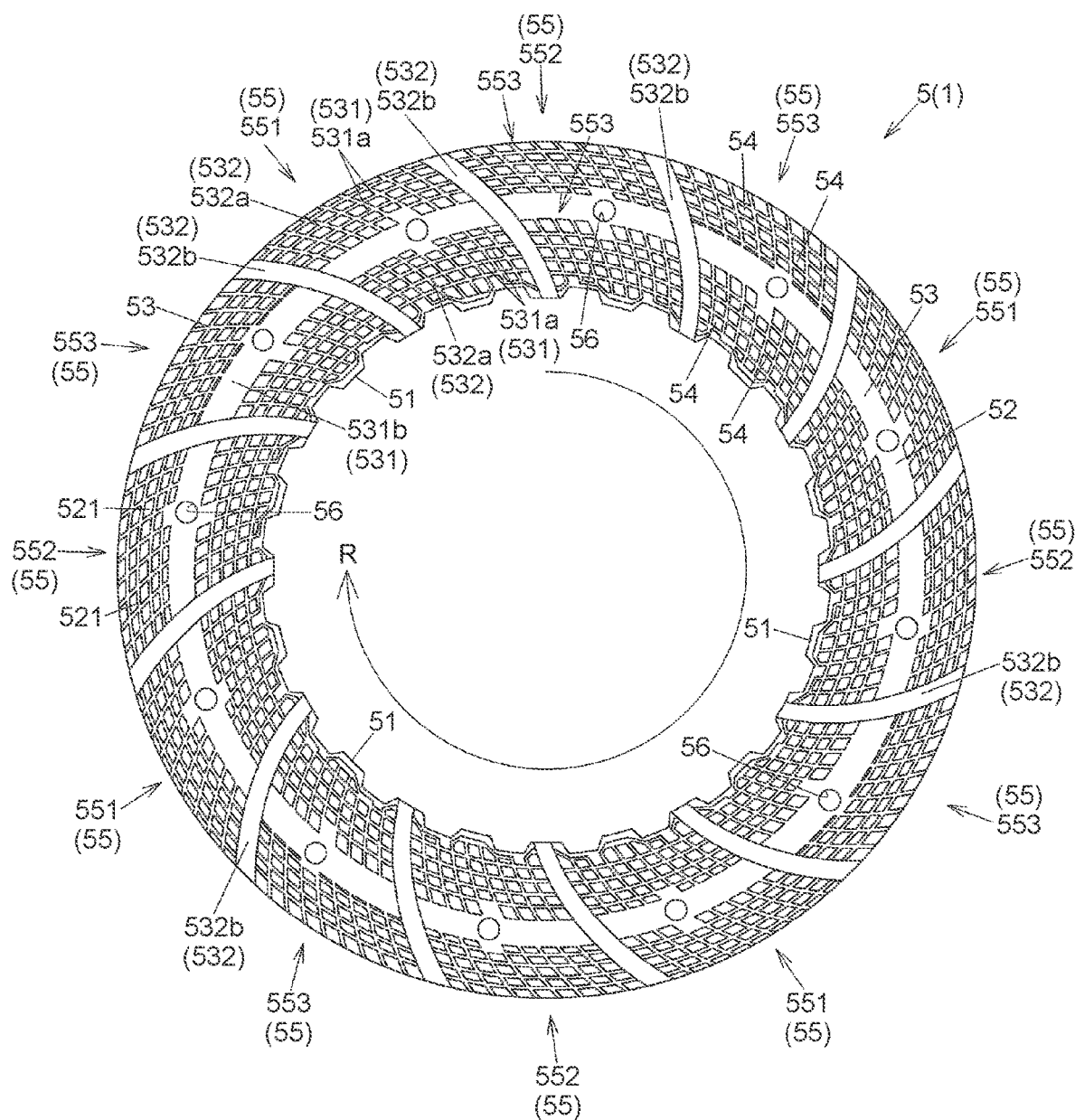
FIG. 4 is a front view of an armature as a wet friction disc in the first embodiment.
Figure 5:
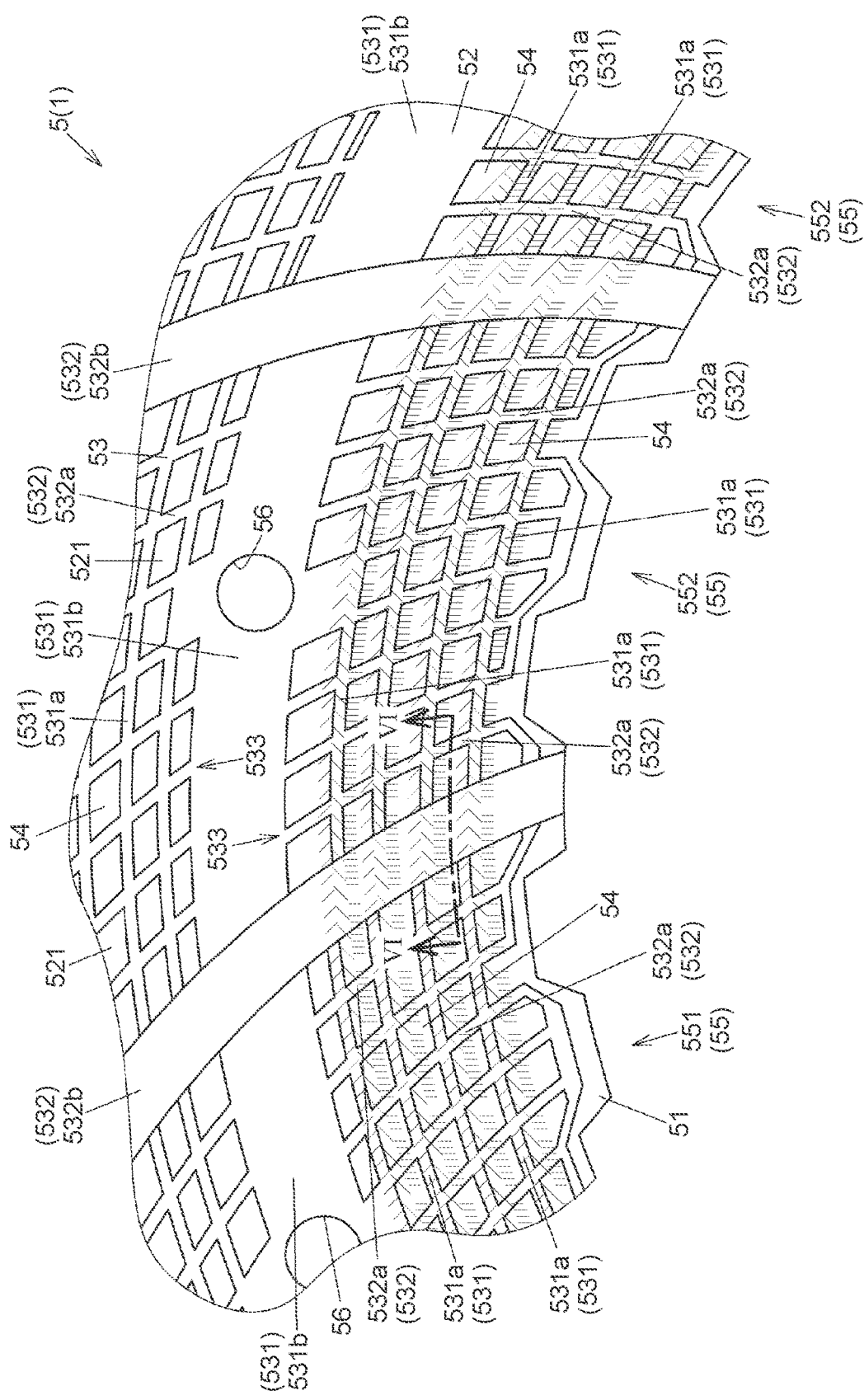
FIG. 5 is a front view showing part of the armature in the first embodiment in close-up.
Figure 6:
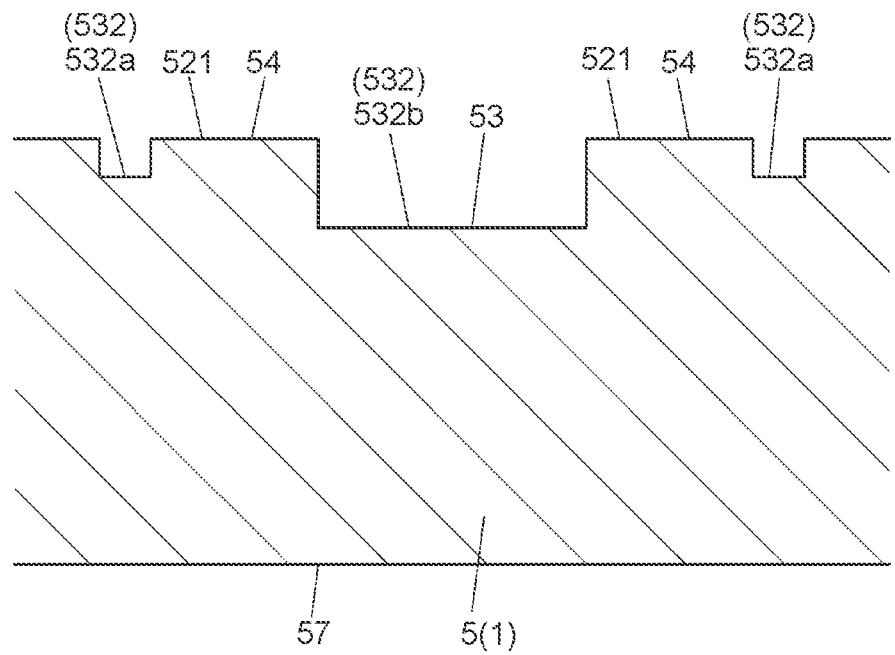
FIG. 6 is a view of section VI-VI of FIG. 5 as seen in the arrow direction.

FIG. 4 is a front view of the armature 5. FIG. 5 is a front view showing part of the armature 5 in close-up. FIG. 6 is a view of section VI-VI of FIG. 5 as seen in the arrow direction.

In this embodiment, the armature 5 functions as the wet friction disc 1 that generates a frictional force between the outer plate 43 and the armature 5. The outer plate 43 is a mating member that frictionally slides on the armature 5.

The armature 5 is formed by a soft magnetic body in an annular shape and has internal teeth 51 on an inner circumference. The internal teeth 51 are spline-engaged with the external spline teeth 331 of the shaft 3. Thus, the armature 5 is unable to rotate, but movable in the axial direction, relatively to the shaft 3. That is, while the outer plate 43 together with the housing member 2 is configured to be unable to rotate relatively to the vehicle body as described above, the armature 5 is configured to be able to rotate integrally with the shaft 3. The detailed shape of the armature 5 will be described later.

As shown in FIG. 1 to FIG. 3, the annular snap ring 44 is disposed on the side of the armature 5 opposite from the outer plate 43. The snap ring 44 is fitted and fixed in a recess formed in the external spline teeth 331 of the housing member 2. The snap ring 44 faces the armature 5 in the axial direction and restrains the armature 5 from moving toward the side away from the yoke 41.

The braking mechanism 4 brakes the rotation of the shaft 3 based on the following principle. When a current is applied to the magnetic coil 42, as shown in FIG. 3, magnetic flux is generated in an annular magnetic path 14 that passes through the yoke 41, the outer plate 43, and the armature 5 that are made of a soft magnetic material. Specifically, the magnetic path 14 has a pair of first magnetic path portions 141 that passes through the armature 5 and the outer plate 43 in the axial direction and is formed at positions spaced from each other in the radial direction, and a pair of second magnetic path portions 142 that connects the first magnetic path portions 141 to each other at both ends. Due to an action that tries to reduce the magnetic resistance of the magnetic path 14, the outer plate 43 and the armature 5 are magnetically attracted to the yoke 41, so that the yoke 41, the outer plate 43, and the armature 5 are laid on top of one another in the axial direction. As a result, the armature 5 and the outer plate 43 frictionally engage with each other in the circumferential direction, thereby braking the rotation of the shaft 3.

A lubricant is introduced into the housing space of the housing member 2. The housing space inside the housing member 2 is hermetically closed in a state where the housing member 2 is fastened at the flange 24 to the fixed cover that is fixed on the vehicle body. For example, the lubricant is transmission oil and is introduced to a level near a rotational axis of the shaft 3 when the shaft 3 is in a non-rotating state. The lubricant lubricates the braking mechanism 4 and others.

Detailed Shape of Armature 5

Next, the detailed shape of the armature 5 will be described using FIG. 4 to FIG. 6. The armature 5 has a lubrication groove 53 which is formed in an opposite surface 52 facing the outer plate 43 and through which the lubricant flows.

The armature 5 has a plurality of lands 54 that is at least partially defined by the lubrication groove 53 and raised toward the outer plate 43 in the axial direction compared with the lubrication groove 53. Most of the lands 54 have a quadrangular shape, but those lands 54 that are adjacent to an inner circumferential edge of the armature 5 have a shape extending along the inner circumferential edge of the armature 5.

Surfaces of the lands 54 on the side of the outer plate 43 constitute a friction surface 521 that frictionally slides on the outer plate 43. The friction surface 521 frictionally slides on the outer plate 43, which is disposed so as to face the friction surface 521 in the axial direction, with the lubricant present between the friction surface 521 and the outer plate 43. The friction surface 521 has microgrooves extending along the circumferential direction. The armature 5 including these microgrooves is formed by pressing, and, to secure hardness, the surfaces of the armature 5 are subjected to a process of forming a film of diamond-like carbon (DLC), which has high hardness. Thus, the hardness of at least the friction surface 521 is higher than the hardness of the surfaces of the outer plate 43.

The lubrication groove 53 includes: lattice grooves 533 in a lattice pattern that each have a plurality of first circumferential groove portions 531a having an arc shape and a plurality of first intersecting groove portions 532a extending in directions intersecting the first circumferential groove portions 531a; and second circumferential groove portion 531b and second intersecting groove portions 532b that define a formation area of each lattice groove 533. Both the first circumferential groove portions 531a and the second circumferential groove portion 531b extend in the circumferential direction and have predetermined groove widths in the radial direction. Hereinafter, the first circumferential groove portions 531a and the second circumferential groove portion 531b will be collectively referred to as circumferential groove portions 531. Both the first intersecting groove portions 532a and the second intersecting groove portions 532b are formed so as to extend in directions intersecting the circumferential direction and have predetermined groove widths in directions perpendicular to their respective longitudinal directions and along the circumferential direction. Hereinafter, the first intersecting groove portions 532a and the second intersecting groove portions 532b will be collectively referred to as intersecting groove portions 532.

The second circumferential groove portion 531b is formed at a central part of the armature 5 in the radial direction between an inner circumferential end and an outer circumferential end, along the entire circumference of the armature 5. The second circumferential groove portion 531b has a larger flow passage cross-sectional area than the first circumferential groove portion 531a. Here, the flow passage cross-sectional area of each portion of the lubrication groove 53 is the product of the depth and the groove width of the lubrication groove 53.

As shown in FIG. 4, the second circumferential groove portion 531b is formed so as to have the same depth as the first circumferential groove portion 531a and a larger groove width in the radial direction than the first circumferential groove portion 531a. The groove width of the second circumferential groove portion 531b is five or more times larger than the groove width of the first circumferential groove portion 531a. Thus, the flow passage cross-sectional area of the second circumferential groove portion 531b orthogonal to the circumferential direction is five or more times larger than the flow passage cross-sectional area of the first circumferential groove portion 531a. As shown in FIG. 1 to FIG. 3, the second circumferential groove portion 531b is formed at a position facing the slits 432 of the outer plate 43 in the axial direction. In FIG. 1 to FIG. 3, portions of the lubrication groove 53 other than the second circumferential groove portion 531b are omitted.

The second intersecting groove portions 532b are formed at 12 locations at regular intervals in the circumferential direction. The second intersecting groove portions 532b are formed from the inner circumferential end to the outer circumferential end of the armature 5 and have a larger flow passage cross-sectional area than the first intersecting groove portions 532a. As shown in FIG. 6, the second intersecting groove portions 532b are formed as grooves that are wider and deeper than the first intersecting groove portions 532a. In this embodiment, the depth of the second intersecting groove portion 532b is two or more times larger than the depth of the first intersecting groove portion 532a. The groove width of the second intersecting groove portion 532b is five or more times larger than the groove width of the first intersecting groove portion 532a. Thus, the flow passage cross-sectional area of the second intersecting groove portion 532b is ten or more times larger than the flow passage cross-sectional area of the first intersecting groove portion 532a.

Each of the first intersecting groove portions 532a and the second intersecting groove portions 532b is formed at an angle to the radial direction such that a region of the intersecting groove portion farther on the outer circumferential side is located farther on the opposite side from a rotation direction R of the shaft 3. In this embodiment, the first intersecting groove portions 532a and the second intersecting groove portions 532b are curved such that the amount of movement toward the opposite side from the rotation direction R becomes larger toward the outer circumferential side.

The lattice grooves 533 are formed in a plurality of areas of the opposite surface 52 surrounded by the second circumferential groove portion 531b and the second intersecting groove portions 532b provided at 12 locations. Each lattice groove 533 has the first circumferential groove portions 531a that are disposed at intervals in the radial direction and the first intersecting groove portions 532a that are disposed at intervals in the circumferential direction.

As shown in FIG. 5, each first circumferential groove portion 531a has an arc shape along the circumferential direction so as to connect to each other a pair of second intersecting groove portions 532b adjacent to each other in the circumferential direction. Those first intersecting groove portions 532a that are included in the lattice grooves 533 formed on the outer circumferential side of the second circumferential groove portion 531b are formed from the second circumferential groove portion 531b to the outer circumferential edge of the armature 5. Those first intersecting groove portions 532a that are included in the lattice grooves 533 formed on the inner circumferential side of the second circumferential groove portion 531b are formed from the second circumferential groove portion 531b to a point short of the lands 54 that are formed at an inner circumferential end of the armature 5, along the inner circumferential edge of the armature 5. In this embodiment, an arbitrary first intersecting groove portion 532a of the lattice grooves 533 formed on the inner circumferential side of the second circumferential groove portion 531b continues smoothly to one of the first intersecting groove portions 532a of the lattice grooves 533 formed on the outer circumferential side of the second circumferential groove portion 531b.

Hereinafter, each area between the second intersecting groove portions 532b adjacent to each other in the circumferential direction will be referred to as a segment 55. Since the second intersecting groove portions 532b are formed at 12 locations at regular intervals in the circumferential direction as described above, the segments 55 defined by the second intersecting groove portions 532b are formed at 12 locations in the circumferential direction.

The segments 55 at 12 locations include three patterns of segments 55 different from one another in the positions of the first circumferential groove portions 531a in the radial direction. These three patterns of segments 55 will be referred to as a first segment 551, a second segment 552, and a third segment 553.

In this embodiment, the segments 55 at 12 locations are formed by arranging, in the circumferential direction, four sets of segments 55, each consisting of the first segment 551, the second segment 552, and the third segment 553 that are sequentially arranged in the circumferential direction. Thus, the first segment 551, the second segment 552, and the third segment 553 are located adjacent to one another in the circumferential direction, while the first circumferential groove portions 531a of the first segment 551, the first circumferential groove portions 531a of the second segment 552, and the first circumferential groove portions 531a of the third segment 553 are formed at positions offset from one another in the radial direction.

Specifically, as shown in FIG. 5, the first circumferential groove portions 531a of the second segment 552 are formed at positions offset from the first circumferential groove portions 531a of the first segment 551 toward the inner circumferential side by the groove width of the first circumferential groove portions 531a of the first segment 551. The first circumferential groove portions 531a of the third segment 553 are formed at positions offset from the first circumferential groove portions 531a of the second segment 552 toward the inner circumferential side by the groove width of the first circumferential groove portions 531a of the second segment 552. Further, those first circumferential groove portions 531a of the first segment 551 that are formed on the inner circumferential side of the first circumferential groove portions 531a of the third segment 553 are formed at positions offset from the first circumferential groove portions 531a of the third segment 553 toward the inner circumferential side by a groove width that is slightly larger than the groove width of the first circumferential groove portions 531a of the third segment 553.

Thus, a pair of first circumferential groove portions 531a disposed in a pair of adjacent segments 55 located one on each side of an arbitrary second intersecting groove portion 532b in the circumferential direction is disposed at such positions as to be entirely offset from each other in the radial direction. As a result, an end of an arbitrary first circumferential groove portion 531a in the circumferential direction is located adjacent to one of the lands 54, while the groove width of the first circumferential groove portion 531a adjacent to that land 54 is entirely contained within a range in the radial direction spanned by that land 54. In other words, areas defined by extending, in the circumferential direction, the first circumferential groove portions 531a formed in an arbitrary segment 55, i.e., the hatched areas in FIG. 5, pass through the lands 54 in the segments 55 adjacent to that segment 55 in their entirety in the radial direction.

The armature 5 has through-holes 56 that extend through the armature 5 between the opposite surface 52 and a surface 57 on the opposite side in the axial direction and open in the second circumferential groove portion 531b. In this embodiment, one through-hole 56 is formed in each segment 55 and formed so as to open in the second circumferential groove portion 531b. As described above, the second circumferential groove portion 531b is a portion that faces the slits 432 of the outer plate 43 and located between the pair of first magnetic path portions 141 in the radial direction. Even when the through-holes 56 are formed in the armature 5, if these through-holes 56 are formed so as to open in the second circumferential groove portion 531b, an increase in the magnetic resistance of the magnetic path 14 at portions contacting the outer plate 43 can be mitigated. The through-holes 56 open in the second circumferential groove portion 531b, each at a position between a pair of second intersecting groove portions 532b adjacent to each other in the circumferential direction among the second intersecting groove portions 532b, at a position spaced from that pair of second intersecting groove portions 532b. In this embodiment, the through-holes 56 each open at a central position in the circumferential direction between a pair of second intersecting groove portions 532b that is adjacent to each other in the circumferential direction among the second intersecting groove portions 532b.

Flow of Lubricant Inside Lubrication Groove 53

Figure 7:
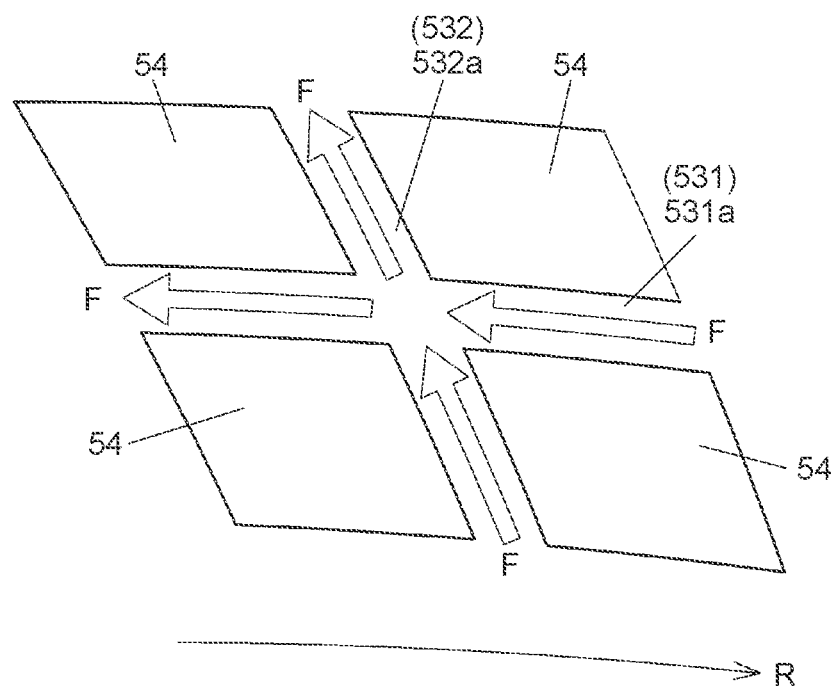
FIG. 7 is a partially enlarged front view of the armature, showing the flow of a lubricant in a lubrication groove in the first embodiment.

Next, how the lubricant flows through the lubrication groove 53 as the shaft 3 rotates will be described using FIG. 7. FIG. 7 is a partially enlarged front view of the armature 5, showing a flow F of the lubricant in the lubrication groove 53. The upper side of the sheet of FIG. 7 corresponds to the outer circumferential side of the armature 5.

First, when the shaft 3 and the armature 5 rotate, due to the rotary force and the centrifugal force of the armature 5, the lubricant spreads from the second circumferential groove portion 531b and the second intersecting groove portions 532b having relatively large flow passage cross-sectional areas to the entire opposite surface 52 of the armature 5. Thus, the friction surface 521 of the armature 5 and the outer plate 43 are prevented from wearing each other away.

As shown in FIG. 7, most of the lubricant flowing through the circumferential groove portions 531 advances toward the opposite side from the rotation direction R of the shaft 3 relatively to the armature 5 due to an inertial force that tries to keep the lubricant standing still against the rotation of the armature 5. Most of the lubricant flowing through the intersecting groove portions 532 flows toward the outer circumferential side due to the centrifugal force. Part of the lubricant flowing through the circumferential groove portions 531 is discharged toward the outer circumferential side of the armature 5 due to the flow of the lubricant flowing through the first intersecting groove portions 532a and the centrifugal force, or reaches the second intersecting groove portions 532b and is discharged through the second intersecting groove portions 532b toward the outer circumferential side of the armature 5.

Here, the lattice grooves 533 have a small flow passage cross-sectional area and high resistance to the flow of the lubricant, whereas the second circumferential groove portion 531b has a large flow passage cross-sectional area and the lubricant flows more smoothly therethrough. Therefore, the through-holes 56 are provided so as to open in the second circumferential groove portion 531b to thereby discharge the lubricant in the second circumferential groove portion 531b toward the side of the armature 5 opposite from the outer plate 43 through the through-holes 56.

Workings and Effects of First Embodiment

Figure 12:
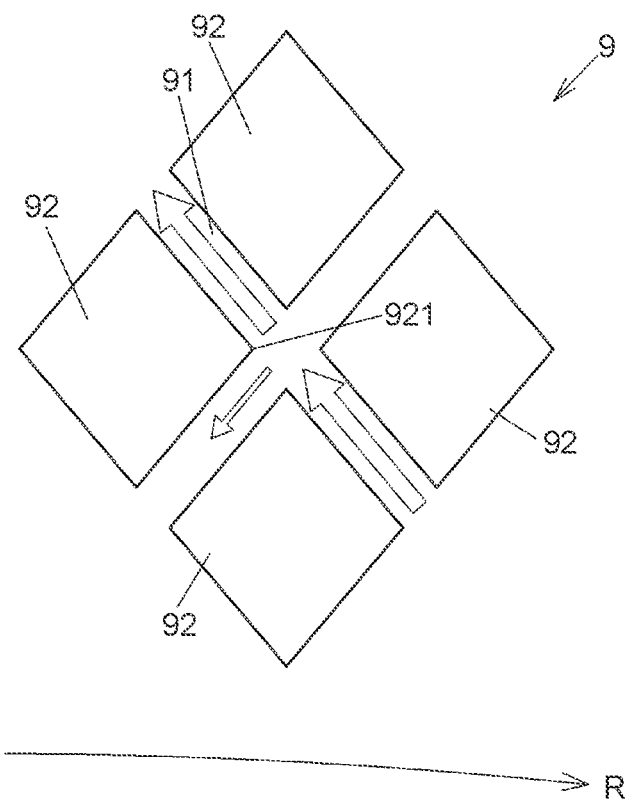
FIG. 12 is a schematic view showing the flow of lubricating oil flowing through a conventional lubrication groove.

In this embodiment, the lubrication groove 53 of the armature 5 includes the circumferential groove portions 531 that extend in the circumferential direction and the intersecting groove portions 532 that intersect the circumferential direction. Thus, compared with when a lubrication groove 91 is formed in a lattice pattern at an angle to both the radial direction and the circumferential direction as shown in FIG. 12, the lubricating oil is less likely to be guided toward the inner circumferential side when the armature 5 rotates, and the lubricating oil passing through the lubrication groove 53 can be discharged toward the outer circumferential side of the armature 5 more efficiently. Here, the lubricant flowing through the circumferential groove portions 531 along the circumferential direction can flow into the intersecting groove portions 532 and be discharged through the intersecting groove portions 532 toward the outer circumferential side of the armature 5, but such lubricant is not efficiently discharged toward the outer circumferential side of the armature 5 compared with the lubricant that flows through the intersecting groove portions 532. In this embodiment, therefore, the through-holes 56 that extend through the armature 5 between the opposite surface 52 and the surface 57 on the opposite side in the axial direction are formed so as to open in at least one of the circumferential groove portions 531. Thus, the lubricant flowing through the circumferential groove portion 531 of the armature 5 in the circumferential direction is discharged through the through-holes 56 toward the side of the armature 5 opposite from the outer plate 43. Accordingly, the lubricant flowing through the circumferential groove portions 531 can be discharged from between the armature 5 and the outer plate 43 more efficiently. As a result, the lubricating oil between the armature 5 and the outer plate 43 can be quickly discharged at the time of switching between the non-frictionally-engaged state and the frictionally-engaged state, which enhances the responsiveness of the braking device 10.

The through-holes 56 each open at one end in the second circumferential groove portion 531b that is formed along the entire circumference of the armature 5. The through-holes 56 are formed so as to open in the second circumferential groove portion, each at a position between a pair of second intersecting groove portions 532b that is adjacent to each other in the circumferential direction among the second intersecting groove portions 532b having a larger flow passage cross-sectional area than the first intersecting groove portions 532a, at a position spaced from that pair of second intersecting groove portions 532b. Here, as described above, the second intersecting groove portions 532b have a relatively large flow passage cross-sectional area and the lubricant flowing through the second intersecting groove portions 532b is smoothly discharged toward the outer circumferential side of the armature 5. Accordingly, the lubricant flowing through regions of the second circumferential groove portion 531b near the second intersecting groove portions 532b is smoothly discharged from the second circumferential groove portion 531b toward the outer circumferential side of the armature 5, and poses little concern about a decrease in the discharge efficiency of the lubricant. On the other hand, the lubricant flowing through regions of the second circumferential groove portion 531b that are spaced from the second intersecting groove portions 532b, by comparison, is not efficiently discharged toward the outer circumferential side of the armature 5. Therefore, one end of each through-hole 56 is formed at a position spaced from a pair of second intersecting groove portions 532b that is adjacent to each other in the circumferential direction, to thereby allow the lubricant flowing through regions of the second circumferential groove portion 531b spaced from the second intersecting groove portions 532b to be discharged through the through-holes 56 toward the side of the armature 5 opposite from the outer plate 43. As a result, the lubricant flowing through the second circumferential groove portion 531b can be discharged from between the armature 5 and the outer plate 43 more efficiently. In particular, in this embodiment, the through-holes 56 are each formed at a central position in the circumferential direction between a pair of second intersecting groove portions 532b adjacent to each other in the circumferential direction. Thus, the lubricant can be discharged from between the armature 5 and the outer plate 43 even more efficiently.

Further, the through-holes 56 are formed in an area between the pair of first magnetic path portions 141 in the radial direction. This can mitigate the increase in the magnetic resistance of the entire magnetic path 14 resulting from forming the through-holes 56 in the armature 5 that extend through the armature 5 in the axial direction. Specifically, when the through-holes 56 extending along the first magnetic path portions 141 are formed at portions of the armature 5 that constitute part of the first magnetic path portions 141, the magnetic resistance of the first magnetic path portions 141 increases and thus the magnetic resistance of the entire magnetic path 14 increases. This embodiment can avoid this situation. As a result, a decrease in responsiveness of the braking device 10 caused by forming the through-holes 56 can be mitigated.

Here, if each circumferential groove portion 531 is a groove continuous along the entire circumference, no land 54 is present along the entire circumference in an area where the circumferential groove portion 531 is formed. As a result, the outer plate 43 that frictionally slides on the friction surface 521 of the armature 5 develops irregularities over time as those portions of the outer plate 43 that face the lands 54 wear down by frictionally sliding on the friction surface 521 of the lands 54 while those portions that face the circumferential groove portions 531 do not frictionally slide on the friction surface 521 of the lands 54 and therefore do not wear down.

To avoid this, in this embodiment, at least some of the circumferential groove portions 531 have an arc shape such that the end in the circumferential direction is located adjacent to one of the lands 54 in the circumferential direction while the groove width is entirely contained within the range in the radial direction spanned by that land 54. Thus, areas where the lands 54 are not present can be reduced to allow the surface of the outer plate 43 that faces the armature 5 to wear away evenly. As a result, the outer plate 43 is less likely to develop surface irregularities as described above.

The circumferential groove portions 531 include the first circumferential groove portions 531a that have an arc shape and the second circumferential groove portion 531b that is provided along the entire circumference. A pair of first circumferential groove portions 531a among the first circumferential groove portions 531a that is formed at adjacent positions, one on each side of the intersecting groove portion 532 in the circumferential direction, is disposed at such positions as to be entirely offset from each other in the radial direction. Thus, the lubrication groove 53 can be formed such that the first circumferential groove portions 531a in the respective segments 55 are not continuous along the entire circumference in the circumferential direction. As a result, the outer plate 43 is less likely to develop surface irregularities, and at the same time, the lubricating oil can be spread along the entire circumference by the second circumferential groove portion 531b and wear of the armature 5 and the outer plate 43 can be mitigated.

The intersecting groove portions 532 include the first intersecting groove portions 532a and the second intersecting groove portions 532b having a larger flow passage cross-sectional area than the first intersecting groove portions 532a. Thus, the lattice grooves 533 each composed of the first circumferential groove portions 531a and the first intersecting groove portions 532a are respectively formed in the areas surrounded by the second circumferential groove portion 531b and the second intersecting groove portions 532b. A pair of first circumferential groove portions 531a among the first circumferential groove portions 531a that is formed at adjacent positions, one on each side of the second intersecting groove portion 532b in the circumferential direction, is disposed at such positions as to be entirely offset from each other in the radial direction. Thus, while the lattice grooves 533 composed of the first circumferential groove portions 531a and the first intersecting groove portions 532a tend to have high resistance to the flow of the lubricant, forming the first circumferential groove portions 531a so as to extend in the circumferential direction in the lattice grooves 533 can prevent the lubricant from having extreme difficulty flowing through the lattice grooves 533.

The intersecting groove portions 532 are provided at an angle to the radial direction such that regions of the intersecting groove portions 532 farther on the outer circumferential side are located farther on one side in the circumferential direction. Thus, when the armature 5 is disposed inside the braking device 10 in such a posture that regions of the intersecting groove portions 532 farther on the outer circumferential side are located farther on the opposite side from the rotation direction R, the lubricant flowing through the intersecting groove portions 532 is pressed in directions along the intersecting groove portions 532 by a combination of the centrifugal force directed toward the outer circumferential side and the inertial force, i.e., the force that tries to keep the lubricant standing still against the rotation of the armature 5. As a result, the lubricant can be discharged through the intersecting groove portions 532 more efficiently.

As has been described above, this embodiment can provide the wet friction disc 1 and the braking device 10 as a friction engaging device that can discharge the lubricant more efficiently.

The lubrication groove 53 and the lands 54 formed in the armature 5 in this embodiment may be provided in the surface, facing the armature 5, of the outer plate 43 that frictionally slides on the armature 5. In this case, the outer plate 43 serves as the wet friction disc 1.

Second Embodiment

Figure 9:
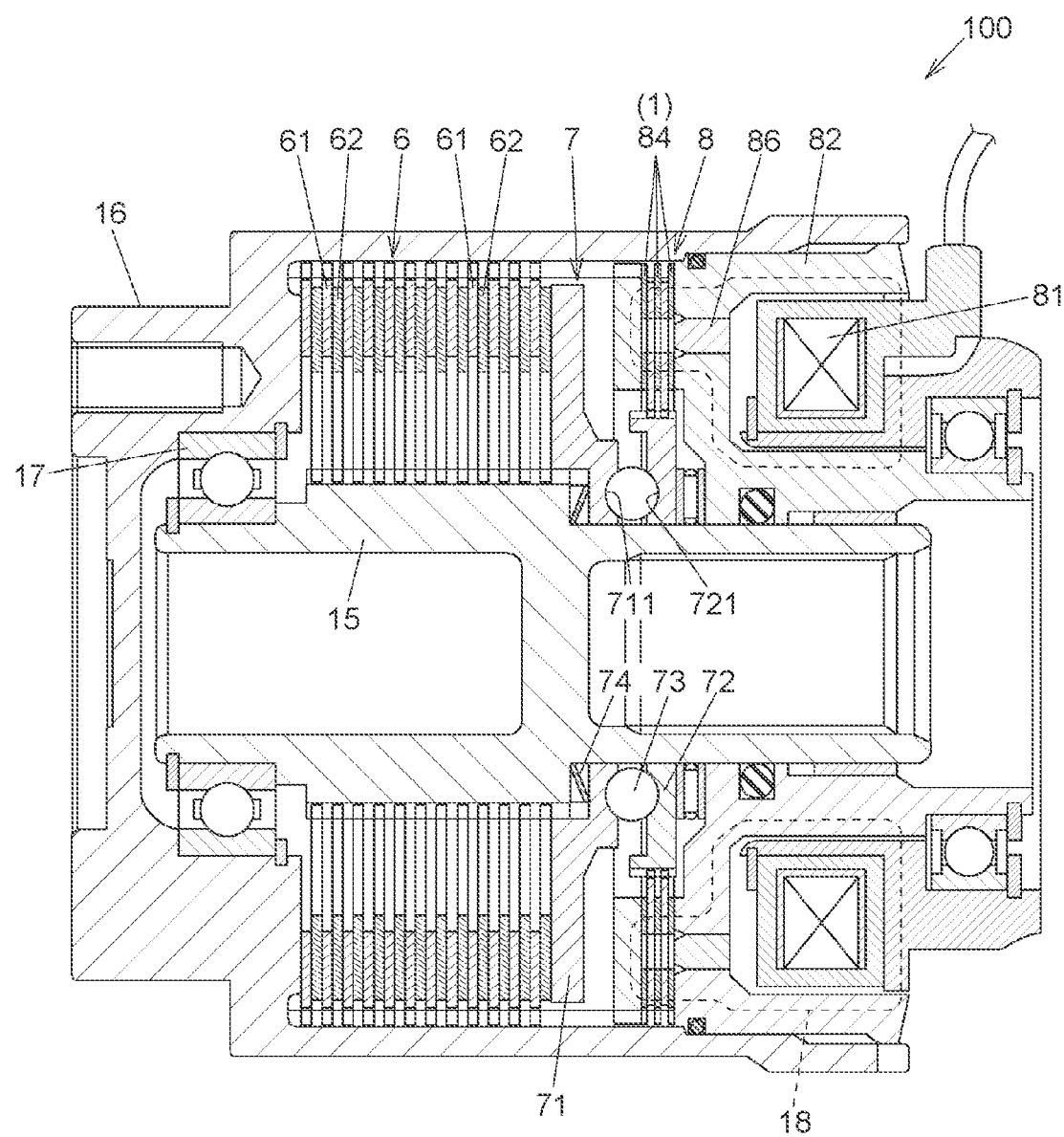
FIG. 9 is a sectional view showing the overall structure of a clutch device in a second embodiment.
Figure 10:
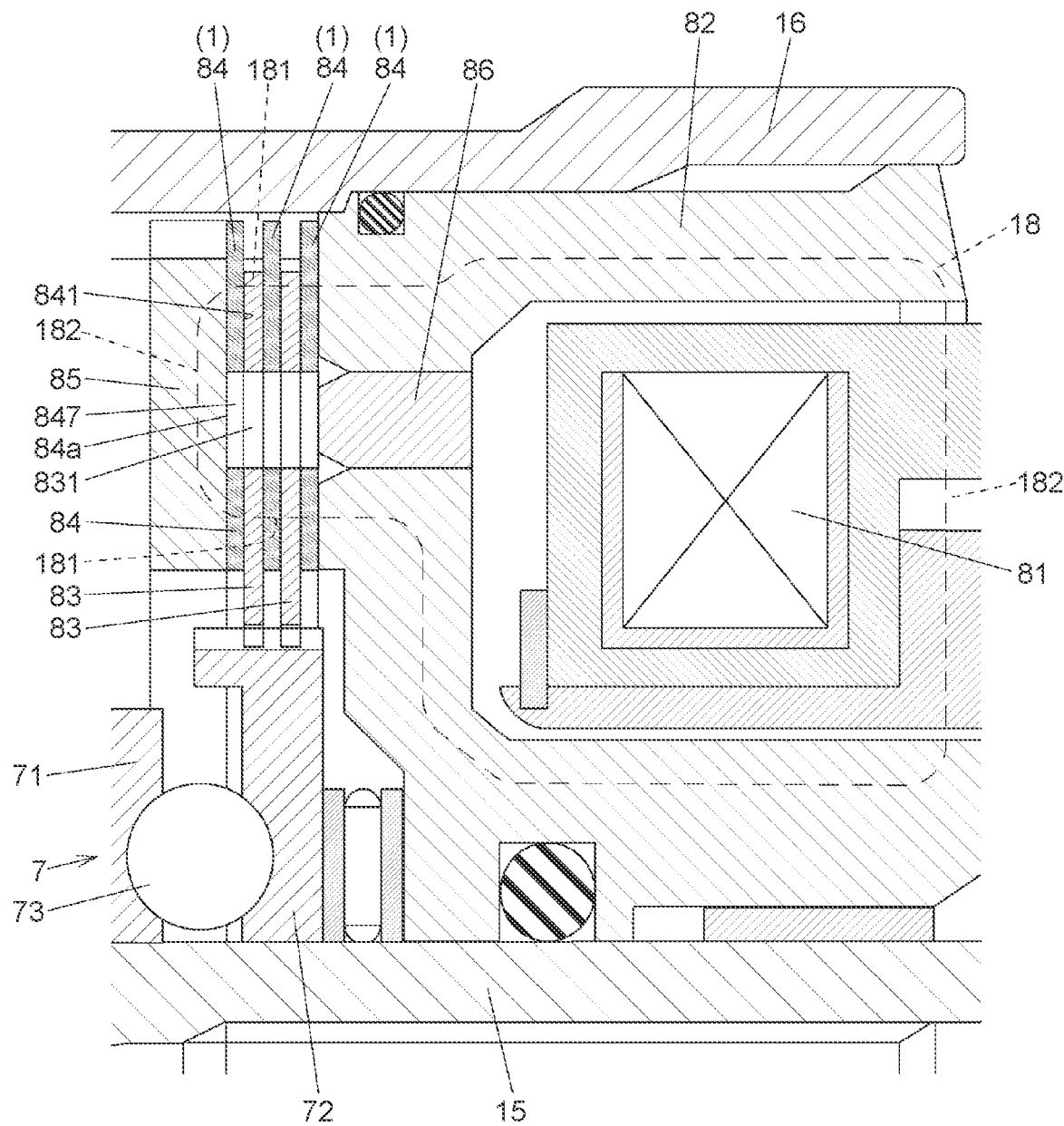
FIG. 10 is an enlarged view around a pilot clutch of FIG. 9.
Figure 11:
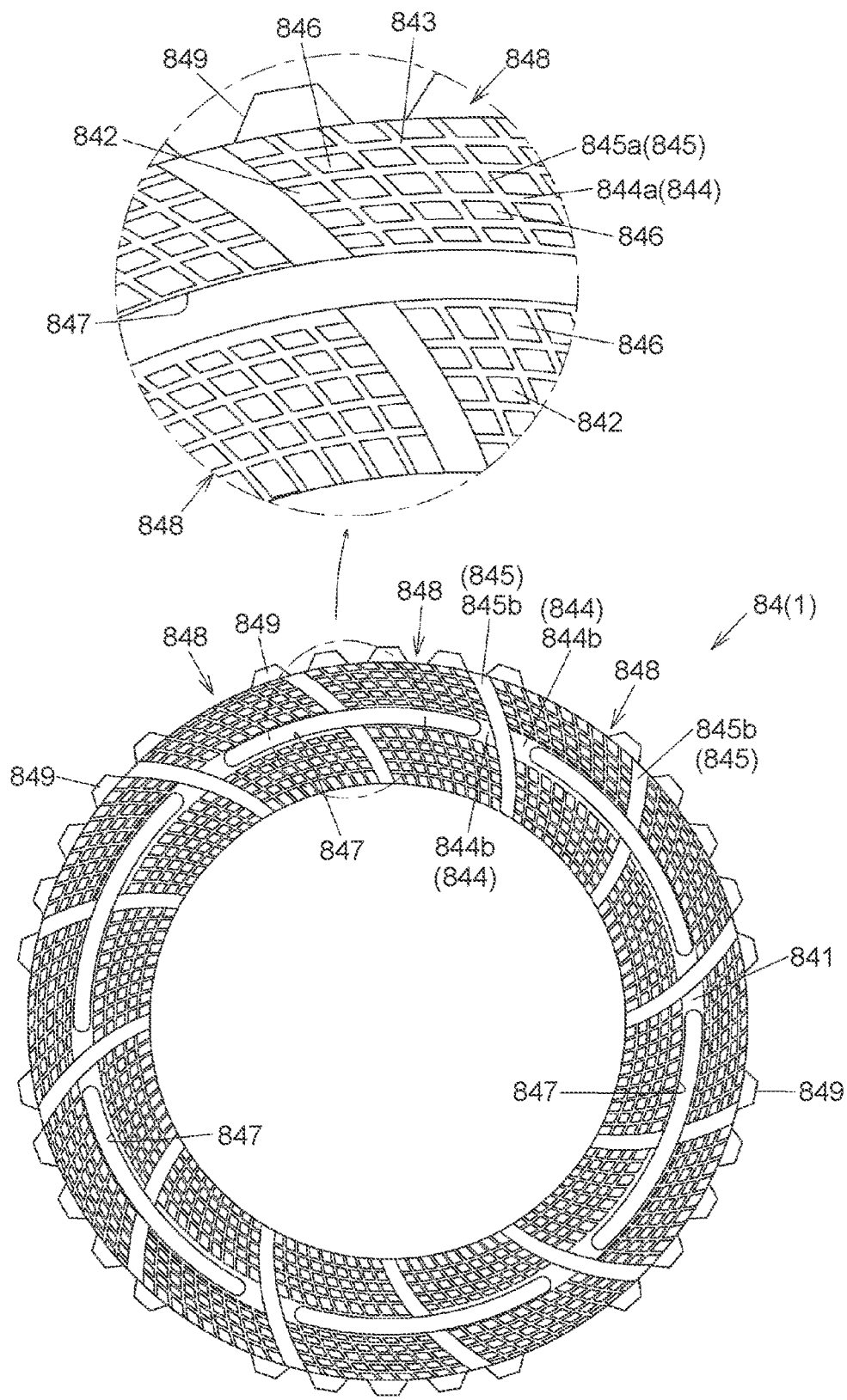
FIG. 11 is a front view of a pilot outer plate as a wet friction disc in the second embodiment, and an enlarged view of part of the pilot outer plate.

This embodiment is an example in which the wet friction disc 1 is used in a clutch device 100 as a friction engaging device. FIG. 9 is a sectional view showing the overall structure of the clutch device 100 of this embodiment. FIG. 10 is an enlarged view around a pilot clutch 8 of FIG. 9. FIG. 11 is a front view of a pilot outer plate 84 as the wet friction disc 1 of this embodiment and an enlarged view of part of the pilot outer plate 84.

The clutch device 100 of this embodiment is a clutch of an electronically controlled 4WD coupling (so-called intelligent torque controlled coupling (ITCC) (R)) type, and is disposed between a propeller shaft and a rear differential device in a four-wheel-drive vehicle to allow or interrupt transmission of a rotary force between the propeller shaft and the rear differential device. Thus, the clutch device 100 switches between a four-wheel-drive state in which the driving power of the engine is transmitted to front wheels and rear wheels and a two-wheel-drive state in which the driving power of the engine is transmitted to only the front wheels. The clutch device 100 of this embodiment includes a housing member 16, an output shaft 15, a main clutch 6, a cam mechanism 7, and the pilot clutch 8.

The housing member 16 is coupled to the propeller shaft through a joint or the like and the rotary force of the propeller shaft is input into the housing member 16. The housing member 16 has an opening on one side in an axial direction. A lubricant for lubricating the main clutch 6, the cam mechanism 7, the pilot clutch 8, and others is introduced into the housing member 16. The output shaft 15 is rotatably held in the housing member 16 through a bearing 17.

The output shaft 15 is coupled to the rear differential device through a joint or the like and transmits the rotary force of the housing member 16 to the rear differential device through the main clutch 6. The main clutch 6 is disposed between the output shaft 15 and the housing member 16.

The main clutch 6 is formed by alternately stacking main outer plates 61 that are spline-engaged with the housing member 16 and main inner plates 62 that are spline-engaged on an outer circumference of the output shaft 15. Specifically, the main outer plates 61 are mounted on the housing member 16 so as to be movable in the axial direction, but unable to rotate, relatively to the housing member 16, and the main inner plates 62 are mounted on the output shaft 15 so as to be movable in the axial direction, but unable to rotate, relatively to the output shaft 15. The main clutch 6 is switched between a frictionally-engaged state and a non-frictionally-engaged state by a pressing force from the cam mechanism 7.

The cam mechanism 7 has a main cam 71 that presses the main clutch 6 in the axial direction, a pilot cam 72 that can rotate relatively to the main cam 71, and a plurality of cam balls 73 that is disposed between the main cam 71 and the pilot cam 72.

The main cam 71 is spline-engaged with the output shaft 15 and urged by a disc spring 74 in a direction away from the main clutch 6 in the axial direction. The pilot cam 72 is spline-engaged with a pilot inner plate 83, and when the pilot clutch 8 is engaged, the rotary force of the housing member 16 is transmitted to the pilot cam 72 through the pilot clutch 8.

Surfaces of the main cam 71 and the pilot cam 72 that face each other have a plurality of cam grooves 711, 721 of which the depths in the axial direction become smaller from the center in the circumferential direction with the increasing distance from the center in the circumferential direction. The cam balls 73 are disposed between the cam groove 721 of the pilot cam 72 and the cam groove 711 of the main cam 71. As the pilot cam 72 rotates relatively to the main cam 71, the main cam 71 is pressed by the cam balls 73 toward the side away from the pilot cam 72, and a cam thrust force is exerted by the main cam 71 on the main clutch 6. This cam thrust force compresses the main clutch 6 in its stacking direction, so that the main outer plates 61 and the main inner plates 62 engage with each other and the rotary force of the housing member 16 is transmitted to the output shaft 15.

As shown in FIG. 10, the pilot clutch 8 includes a magnetic coil 81, a yoke 82, pilot inner plates 83 and pilot outer plates 84 that are disposed as a stack, and an armature 85. The magnetic coil 81 generates magnetic flux when a current is applied thereto. The yoke 82 holds the magnetic coil 81. The yoke 82 is made of a soft magnetic material and forms a magnetic path 18 through which magnetic flux passes. The yoke 82 is provided with a non-magnetic ring 86 made of a non-magnetic material to prevent magnetic flux from short-circuiting without passing through the pilot inner plates 83, the pilot outer plates 84, and the armature 85. The pilot inner plates 83 are spline-engaged on an outer circumference of the pilot cam 72, and the pilot outer plates 84 and the armature 85 are spline-engaged on an inner circumference of the housing member 16. The pilot inner plates 83, the pilot outer plates 84, and the armature 85 are made of a soft magnetic material and form the magnetic path 18. The pilot inner plates 83 and the pilot outer plates 84 have through-holes 831, 847 that are provided at positions overlapping the non-magnetic ring 86 in the axial direction to prevent magnetic flux from short-circuiting without passing through the armature 85.

When a current is applied to the magnetic coil 81, magnetic flux is generated in the annular magnetic path 18 passing through the yoke 82, the pilot inner plates 83, the pilot outer plates 84, and the armature 85 made of soft magnetic materials. Specifically, the magnetic path 18 has a pair of first magnetic path portions 181 that passes through the pilot inner plates 83 and the pilot outer plates 84 in the axial direction and is formed at positions spaced from each other in the radial direction, and a pair of second magnetic path portions 182 that connects the pair of first magnetic path portions 181 to each other and is formed in the armature 85 and the yoke 82. Due to an action that tries to reduce the magnetic resistance of the magnetic path 18, the pilot inner plates 83, the pilot outer plates 84, and the armature 85 are magnetically attracted toward the yoke 82, so that the yoke 82, the pilot inner plates 83, and the pilot outer plates 84 are laid on top of one another in the axial direction. Then, the pilot inner plates 83 and the pilot outer plates 84 frictionally engage with each other in the circumferential direction, and the rotation of the pilot outer plates 84 rotating along with the housing member 16 is transmitted to the pilot inner plates 83. When the pilot inner plates 83 rotate, the cam mechanism 7 is activated and exerts a cam thrust force on the main clutch 6, causing the main clutch 6 to engage. Thus, the rotation of the housing member 16 is transmitted to the output shaft 15.

In this embodiment, as shown in FIG. 11, an opposite surface 841 of each pilot outer plate 84 of the pilot clutch 8 on the side of the pilot inner plate 83 (in the case of the pilot outer plate 84 on each side of which the pilot inner plate 83 is adjacently located, both surfaces thereof) has the same shape as the opposite surface (see reference sign 52 in FIG. 4) of the armature (see reference sign 5 in FIG. 1) in the first embodiment, except for the shape of through-holes 847 to be described later. Specifically, the opposite surface 841 of the pilot outer plate 84 has a lubrication groove 843 including circumferential groove portions 844 and intersecting groove portions 845. As in the first embodiment, the lubrication groove 843 includes: the circumferential groove portions 844 that include a plurality of first circumferential groove portions 844a and a second circumferential groove portion 844b formed along the entire circumference; and the intersecting groove portions 845 that include a plurality of first intersecting groove portions 845a and a plurality of second intersecting groove portions 845b. The pilot outer plate 84 has lands 846 defined by the lubrication groove 843. Surfaces of the lands 846 on the side of the pilot inner plate 83 constitute a friction surface 842 that frictionally slides on the pilot inner plate 83. In this embodiment, the lubrication groove 843 is not formed in external teeth 849 of the pilot outer plate 84 that spline-engage with the housing member 16, but may also be formed therein. Unless otherwise mentioned, the configuration of the lubrication groove 843 and the lands 846 is the same as in the first embodiment.

The pilot outer plate 84 has the through-holes 847 that extend through the pilot outer plate 84 between the opposite surface 841 and a surface 84a on the opposite side in the axial direction and open in the second circumferential groove portion 844b. The through-holes 847 have an arc shape along substantially the entire length of two adjacent segments 848 in the circumferential direction. The through-holes 847 are each formed at a position a little spaced inward in the circumferential direction from a pair of second intersecting groove portions 845b that is located on both sides of and adjacent to the through-hole 847 in the circumferential direction. The through-holes 847 serve to prevent short-circuit in the magnetic path as described above and to let the lubricating oil out.

The second embodiment is otherwise the same as the first embodiment. Unless otherwise noted, the names of constituent elements used in the second embodiment that are the same as those used in the preceding embodiment represent the same constituent elements as in the preceding embodiment.

Workings and Effects of Second Embodiment

In this embodiment, the through-holes 847 are each formed over a wide range of the second circumferential groove portion 844b so as to cross one second intersecting groove portion 845b. Therefore, the lubricant flowing through the second circumferential groove portion 844b can be smoothly discharged from between the pilot outer plate 84 and the pilot inner plate 83 through the through-holes 847. In addition, this embodiment has the same workings and effects as the first embodiment.

While the lubrication groove 843 is provided in the pilot outer plates 84 in this embodiment, the lubrication groove 843 can instead be provided in at least one of the pilot inner plates 83, the main inner plates 62, and the main outer plates 61. In this case, the pilot inner plates 83, the main inner plates 62, and the main outer plates 61 having the lubrication groove 843 serve as the wet friction disc 1.

Notes

While the present disclosure has been described above based on the embodiments, these embodiments do not limit the disclosure according to the claims. It should be noted that not all the combinations of features described in the embodiments are essential for the solution to the problem adopted by the disclosure.

The present disclosure can be implemented with changes made thereto as necessary within the scope of the gist of the disclosure by omitting some of the components or using additional or substituting components.

What is claimed is:

1. A wet friction disc comprising:
   a friction surface that frictionally slides on a mating member, the friction surface provided on a first side of the wet friction disc that faces the mating member in an axial direction; and
   a lubrication groove which is provided on the first side and through which a lubricant supplied to the friction surface flows, wherein:
   the lubrication groove has a plurality of circumferential groove portions that extends in a circumferential direction and a plurality of intersecting groove portions that extends in directions intersecting the circumferential direction;
   at least one of the circumferential groove portions has a through-hole that extends through the wet friction disc between the first side and a second side in the axial direction;
   the intersecting groove portions include a plurality of first intersecting groove portions and a plurality of second intersecting groove portions having a larger flow passage cross-sectional area than the first intersecting groove portions; and
   the through-hole is disposed so as to open in the at least one of the circumferential groove portions at a position between a pair of second intersecting groove portions that is adjacent to each other in the circumferential direction.

2. The wet friction disc according to claim 1, wherein:
the circumferential groove portions include a plurality of first circumferential groove portions that has an arc shape and a second circumferential groove portion that is disposed along an entire circumference; and
the through-hole is disposed so as to open in the second circumferential groove portion, at a position spaced from the pair of second intersecting groove portions.

3. The wet friction disc according to claim 2, wherein the through-hole is disposed so as to open at a central position in the circumferential direction between a pair of second intersecting groove portions that is adjacent to each other in the circumferential direction among the second intersecting groove portions.

4. A friction engaging device comprising:
the wet friction disc according to claim 1;
the mating member disposed so as to face the wet friction disc in the axial direction; and
a magnetic coil disposed next to the wet friction disc and the mating member in the axial direction, wherein:
the wet friction disc and the mating member are each made of a soft magnetic material and constitute a magnetic path of magnetic flux that is generated as a current is applied to the magnetic coil;
the magnetic path is configured to have a pair of first magnetic path portions that passes through the wet friction disc and the mating member in the axial direction and is disposed at positions spaced from each other in a radial direction, and a pair of second magnetic path portions that connects the pair of first magnetic path portions to each other at both ends; and
the through-hole is disposed in an area between the pair of first magnetic path portions in the radial direction.

* * * * *